Jan. 12, 1965     M. WALLSHEIN     3,164,902
ADJUSTABLE ORTHODONTIC BANDS
Filed Jan. 10, 1962
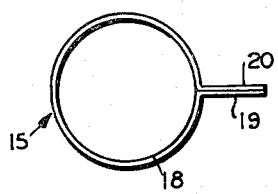
FIG. 2
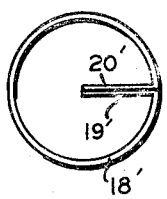
FIG. 3
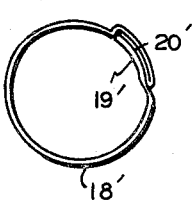
FIG. 4
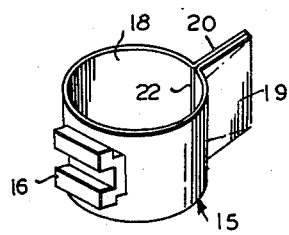
FIG. 1
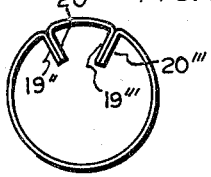
FIG. 5
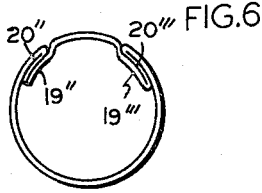
FIG. 6
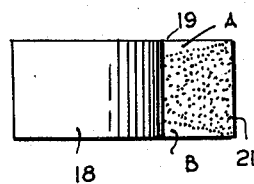
FIG. 7
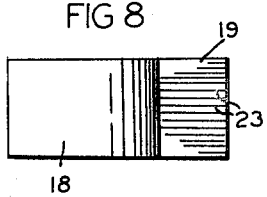
FIG. 8
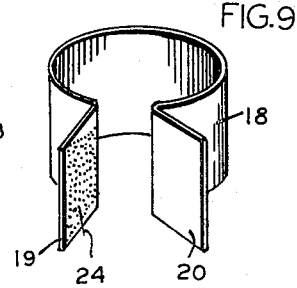
FIG. 9
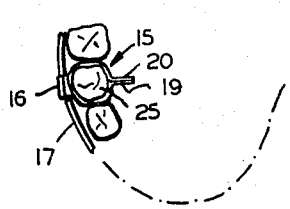
FIG. 10
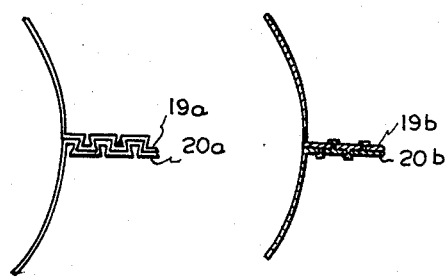
FIG. 11     FIG. 12
INVENTOR,
MELVIN WALLSHEIN,
BY 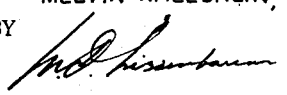
ATTORNEY.

United States Patent Office 3,164,902
Patented Jan. 12, 1965

3,164,902
ADJUSTABLE ORTHODONTIC BANDS
Melvin Wallshein, 9645 Bay Parkway, Brooklyn, N.Y.
Filed Jan. 10, 1962, Ser. No. 165,358
8 Claims. (Cl. 32—14)

The present invention relates to orthodontic appliances and more particularly to bands which are set tightly on teeth; such bands carrying brackets for the support of an arch wire or some element for mounting an elastic member to effect intra or inter maxillary connections, as examples of their use.

Various attempts have heretofore been made to supply bands which could be fitted on teeth of different sizes, but these required that after being mounted and manipulated to fit, each had to be removed to have its size fixed by a welding operation and then replaced onto the tooth it was fashioned on.

It is therefore the principal object of this invention to provide a novel and improved band construction of the character described, which is adapted for teeth of many sizes, but once it is mounted, it will have automatically assumed a tight fit and there will be no need to remove it because it is complete, in place, and requires no welding operation thereafter to fix its size. A bracket or other fitting for an orthondontic practice, being initially an element associated with said band, the installation is ready for use after a simple trimming off of any excess band material. In fact, in some embodiments of this invention, no trimming is required.

A further object is to provide a novel and improved orthodontic band construction having the attributes mentioned, which may be manufactured in but two sizes, one for small teeth and one for larger teeth. The construction of said band is simple, easy to use, reasonable in cost and efficient in carrying out the purposes for which it is designed.

Other objects and advantages will become apparent as this disclosure proceeds.

For one practice of this invention, form the intermediate section of a piece of thin, pliable metal band material into a ring and have the end sections of such strip in face-to-face contact with each other to form an exterior two-ply fin extending laterally from the ring. Another way is to have the fin initially radially inward of the ring and then bent to lie along the ring's inner wall. Still another embodiment is to have two two-ply fins fashioned of the strip to extend into the ring; such pair of fins being then bent to lie along the ring's interior wall. The ring or band, as it may be called, has mounted thereon a suitable bracket for supporting an arch wire or any desired fitting useful in orthodontic practice.

The plies of each fin are secured to each other so that their juncture is weak enough that manual forces can undo their bond gradually to increase ring size, but strong enough to maintain their bond if the forces are merely those normally possible within the mouth, as those exerted by an associated arch wire, other orthodontic appurtenances, or by mouth and tongue movements, or during chewing, talking or brushing, or the manipulation by the patient of his finger in the mouth.

I also provide that the ring is automatically flared at the commencement of its being set onto a tooth to facilitate entry of the tooth therein. Subsequent forcing of the band to gird the tooth will progressively undo the bond of the fin plies, starting at the ring's periphery, and when fully set on the tooth, will tightly engage it.

In the accompanying drawing forming part of this specification, similar characters of reference indicate corresponding parts in all the views.

FIG. 1 is a perspective view of a band embodying the teachings of this invention. Here the two-ply fin is outside the ring. A bracket to support an arch wire is shown mounted on said ring.

FIG. 2 is a top plan view of the band which is included in FIG. 1.

FIG. 3 is a top plan view of a structure showing the form into which the strip is initially bent so that a two-ply fin is interior the ring.

FIG. 4 is a top plan view of the finished band after the plies of the fin in FIG. 3 are bonded and the fin bent to lie along the inner wall of the ring.

FIG. 5 is a top plan view of a structure showing a form into which the strip may be initially bent so that a pair of two-ply fins lie interiorly of the ring.

FIG. 6 is a similar view of the band of FIG. 5, shown in finished condition. Here, the contacting fin plies are bonded and said pair of fins are bent to lie against the inner wall of the ring.

FIGS. 7 and 8 are elevational views of the band shown in FIG. 2 depicting different manners of bonding the fin plies to each other.

FIG. 9 is a perspective view of the band of FIG. 2, showing the ring open and the fin plies separated and a cement on one of the fins for bonding the fins together.

FIG. 10 is a fragmentary plan view of the lower teeth in a mouth, showing the appliance of FIG. 1 mounted on a tooth with its bracket supporting an arch wire.

FIGS. 11 and 12 are enlarged fragmentary views like FIG. 2, showing other ways for attaching the fin plies to each other.

In the drawing, the numeral 15 designates generally a band to be tightly fitted onto a tooth in a patient's mouth and its function here shown is to secure the bracket 16 for the support of an arch wire 17. This band 15 may be made of a length of strip metal, whose intermediate section is formed into a ring 18 whereby the end sections 19, 20 form a two-ply fin extending laterally exteriorly of said ring; said plies being bonded in some suitable fashion to attain the conditions heretofore mentioned. Joining said plies may be very closely spaced pin point welds 21 studding the contacting surfaces, commencing from the split line 22 in the ring 18, or by a series of spaced line welds 23, commencing from said split line or by solder or cement 24. Further examples for such bonding of the fin plies are shown in FIG. 11 where the fin plies, indicated by the numerals 19A, 20A, are crimped to form engaging dove-tail joints and in FIG. 12 where the fin plies, indicated by the numerals 19B, 20B, are attached to each other by a multiplicity of releasable rivet formations in said fin plies 19B, 20B as shown. It is advisable to omit bonding the fin plies in all the embodiments, in at least one of the end regions A, B, which unattached portions are preferably triangular.

In the band shown in FIG. 4, the fin plies 19', 20' are interiorly of the ring 18' against the inside wall of such ring, after being so placed upon bonding them in the initial condition of the strip shown in FIG. 3. In the band shown in FIG. 6, two fins are provided against the interior wall of the ring 18" after the plies 19", 20" had been bonded to form one of such fins and the plies 19''', 20''', bonded to form the second fin.

To apply the fitting of FIG. 1 onto a tooth 25, choose one whose ring 18 is smaller than the tooth and spread the fins 19, 20 apart a bit at their unattached region B to give a flared entrance. Now with a plier gripping the fins away from the split line 22 and with hand or tool pressing down on the attached bracket 16 or on the upper rim of the ring, force the ring onto the tooth with the fins at the lingual side thereof. This will cause progressive opening of the plies 19, 20. When the ring fully girds the tooth, the ring will have become enlarged only as much as is necessary so that finally said ring, as enlarged, will be tight on the tooth. Now upon trimming off the excess fin material, but leaving enough to maintain their bond, the installation is complete. Each of the fittings of FIGS. 4 and 6 is mounted in like manner, after the entrance to the ring is spread apart a bit to provide the flare.

If the unattached regions A, B are not provided, force the fins apart at the ring entrance to provide an initial flare to accommodate mounting the fitting onto the tooth. In instances where the complete fitting is not symmetrical, the unattached region need be provided if used, only at the entrance end of the ring. When the structure is symmetrical, both unattached regions A, B are provided so that entrance of the tooth may be into either end of the ring.

It is evident that I have provided a band which can be fitted to teeth of different sizes, and that once on, it is tight on the tooth and the mounting is finished.

These bands can be made of lengths of strip material of metal or plastic for example, or the strips may be endless when cut from tubing, in which latter event, the distal ends of the plies would be integral. This needs no further illustration for it is readily understood without further pictorial showing, and the term "strip material" as herein anywhere employed shall be deemed to include both forms of stock to make these items.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

I claim:

1. A band of the character described, to be fitted tightly onto a tooth in a mouth, comprising a single thin pliable strip member composed of three consecutive sections; the intermediate section being of ring-form and the other sections being in face-to-face contact with each other, forming a two-ply fin extending from the ring; the contacting faces of said plies being releasably joined to each other at multiple points starting from a region adjacent the ends of said intermediate section and extending to a region at the ends of said plies; the juncture of said plies being weak enough to be manually forced apart starting from the ring and strong enough to avoid their separation by any action as may be occasioned when the ring is tightly fitted on a tooth in the mouth, during chewing or normal manipulation of a finger in the mouth.

2. A band as defined in claim 1, wherein the fin is outside the ring.

3. A band as defined in claim 1, wherein the fin is inside the ring.

4. A band as defined in claim 1, wherein the juncture is effected by an adhesive.

5. A band as defined in claim 1, wherein the juncture is effected by welding.

6. A band as defined in claim 5, wherein the points comprise a plurality of spaced lines extending along the faces of the plies.

7. A band as defined in claim 1, wherein the juncture is effected by crimping the fin.

8. A band as defined in claim 1, wherein the juncture is effected by releasably riveting the plies.

References Cited in the file of this patent

UNITED STATES PATENTS

| | | |
|---|---|---|
| 1,204,114 | Angle | Nov. 7, 1916 |
| 1,670,361 | Johnson | May 22, 1928 |
| 2,030,227 | Richardson | Feb. 11, 1936 |
| 2,267,073 | Boyd | Dec. 23, 1941 |
| 2,749,616 | Curry | June 12, 1956 |